United States Patent

[11] 3,630,139

[72] Inventor Kenneth J. Wehrle
2849 Forist Lane, Mercede, Calif. 95340
[21] Appl. No. 807,564
[22] Filed Mar. 17, 1969
[45] Patented Dec. 28, 1971

[54] COUNTERBALANCING DEVICE
1 Claim, 4 Drawing Figs.
[52] U.S. Cl. ........................................................ 99/421 H,
74/573
[51] Int. Cl. ........................................................ A47j 37/04,
F16f 15/22
[50] Field of Search ........................................... 99/421 H,
420, 419; 74/573; 73/468, 458, 470, 469

[56] References Cited
UNITED STATES PATENTS
| | | | |
|---|---|---|---|
| 3,502,019 | 3/1970 | Koons, Jr. | 74/573 X |
| 131,782 | 10/1872 | Randall | 74/573 |
| 444,081 | 1/1891 | Wright | 74/573 |
| 525,799 | 9/1894 | Rymes | 74/573 |
| 1,313,039 | 8/1919 | Akimoff | 73/469 |
| 1,361,183 | 12/1920 | Reed | 99/346 |
| 1,503,431 | 7/1924 | Schein | 74/573 X |
| 1,833,879 | 11/1931 | Ash | 74/573 X |
| 3,143,003 | 8/1964 | Schmitt | 99/421 H X |
| 3,298,247 | 11/1967 | Juno | 99/421 H UX |

Primary Examiner—Walter A. Scheel
Assistant Examiner—Alan I. Cantor
Attorney—Huebner & Worrel ABSTRACT: A counterbalancing device for a cooking object eccentrically mounted on a rotatably driven barbeque spit including a hub axially positionable on the spit and adapted to be locked thereon. Affixed to the hub are a pair of bosses formed with screw-threaded bores having axes which are substantially mutually perpendicular. Threaded in the bores are elongated screw-threaded weights axially adjustable by turning for precisely adjusting the weights to compensate for any imbalance of the cooking object.

PATENTED DEC 28 1971
3,630,139
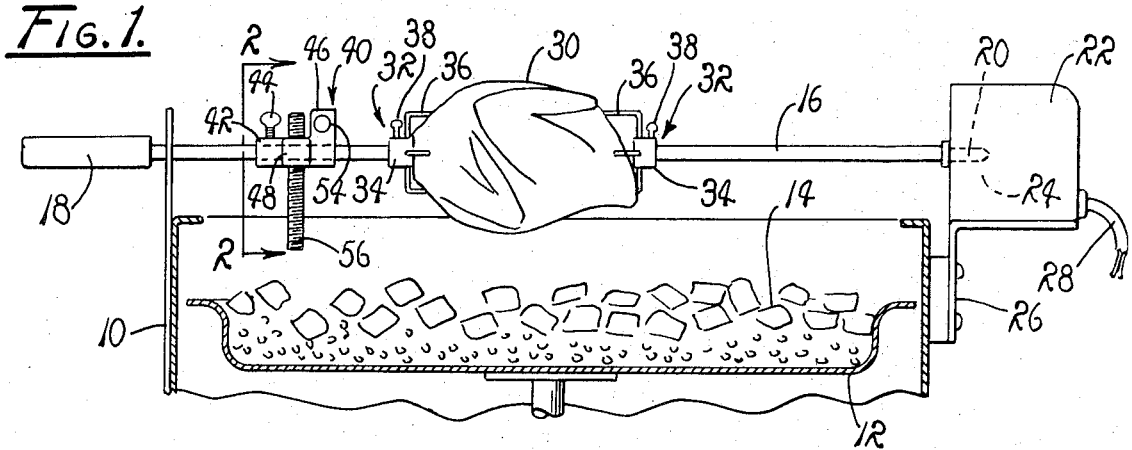
Fig. 1.
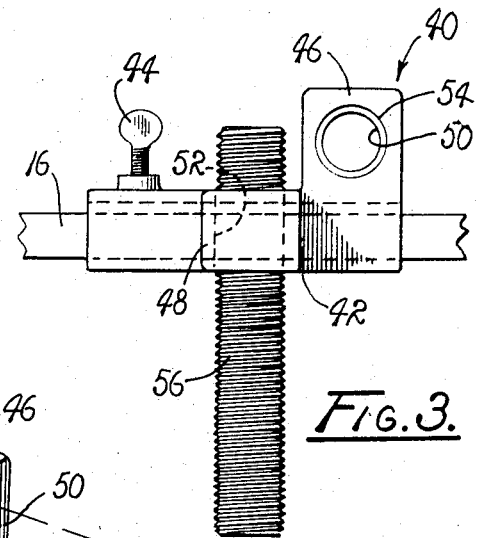
Fig. 2.
Fig. 3.
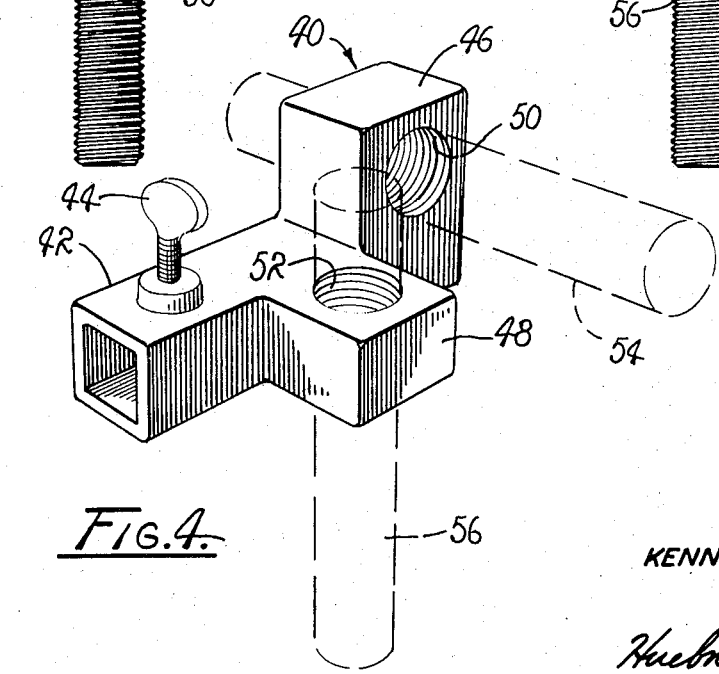
Fig. 4.
KENNETH J. WEHRLE
INVENTOR
Huebner & Worrel.
ATTORNEYS

COUNTERBALANCING DEVICE

BACKGROUND OF THE INVENTION

The present invention relates to a counterbalancing device and more particularly to a device for precisely counterbalancing a cooking object eccentrically mounted on a motor-driven barbeque spit.

In barbequing an object such as a roast, fowl, or the like, the object is transfixed on a rotisserie spit which is adapted to be mounted for rotation over a bed of hot coals and to be driven by an electric motor which the spit is coupled. However, because of the shape of the cooking object, it is virtually impossible to place it on the spit so that the object is symmetrically supported thereon. Such imbalance is further aggravated by the usual loose connection between the motor and the spit which causes intermittent lugging and acceleration of the spit motor and erratic movement of the object as it is rotated. This imposes a substantial strain on the motor and uneven cooking of the cooking object.

SUMMARY OF THE INVENTION

It is therefore an object of the present invention to provide an improved counterbalance device for barbeque spits.

Another object is to provide a counterbalancing device which is capable of being infinitely adjustable for precisely adjusting the center of gravity of a rotatably mounted load.

Another object is to provide a counterbalancing device for a barbeque spit whereby the spit can be rotated in a smooth and continuous manner.

Another object is to provide a counterbalancing device for a motor driven spit for minimizing lugging and acceleration of the motor during rotation of the spit.

Another object is to provide a counterbalancing device for a rotatable spit which has adjustable counterweights for precisely counterbalancing any load on the spit with the weights being easily adjustable during rotation without requiring the motor to be stopped.

Another object is to provide a counterbalancing device of simple and economical construction.

These and other objects and advantages are achieved by an eccentric load counterbalancing device having a hub to which are fixed a pair of angularly related bosses formed with screw-threaded bores having axes with which are substantially mutually perpendicular. Disposed in each of the bores is an elongated screw-threaded counterweight which is axially adjustable by turning for precisely positioning the weights to compensate for any imbalance of the load.

BRIEF DESCRIPTION OF THE DRAWING

FIG. 1 is a fragmentary elevational view, partly in section, of a motor-driven barbeque rotisserie having a spit on which a counterbalancing device embodying the principles of the present invention is mounted.

FIG. 2 is a somewhat enlarged transverse vertical section taken on line 2—2 of FIG. 1 illustrating the weights of the counterbalancing device and their substantially mutually perpendicular relationship.

FIG. 3 is an elevational view of the counterbalancing device with the barbeque spit broken away.

FIG. 4 is a further enlarged perspective view of the device showing the angularly related bosses and the substantially mutually perpendicular relation of the axes therein.

DESCRIPTION OF THE PREFERRED EMBODIMENT

Referring to the drawing, there is shown in FIG. 1 a conventional barbeque rotisserie having a frame 10 suitably supporting a firepan 12 adapted to contain a bed of hot coals 14. Mounted in the frame for rotation about a generally horizontal axis is a spit 16 having a handle end 18 and a driven end 20. The spit is adapted to be rotated by an electric motor 22 which has a coupling sleeve or the like 24 in which the driven end 20 of the spit is received. The motor is supported on the frame by a bracket or the like 26 and is connected to a source of electric power by a cable 28, fragmentarily shown.

The spit 16 is employed in the usual manner to transfix a cooking object 30 such as a fowl, a roast, or the like. The cooking object is held on the spit for rotation therewith by a pair of retainers 32 each having a collar 34 and a plurality of piercing fingers 36 fixed thereto. Each collar is fitted with a thumbscrew 38 which is engageable with the spit for holding its respective retainer in place.

Because of the irregular configuration of the cooking object, it is virtually impossible to transfix the same with the spit 16 so that the cooking object is symmetrically disposed thereon. This results in the cooking object being eccentrically mounted on the spit and constitutes an imbalanced load. To correct the imbalance of the load, there is provided a counterbalancing device 40 embodying the principles of the present invention.

As best shown in FIGS. 2 and 3, the counterbalancing device 40 includes an elongated tubular hub 42 slidably receivable on the spit 16 and axially positionable thereon. While the hub is shown as being substantially square in cross section, it is apparent that it may be constructed in a circular or triangular cross section or any other desired configuration so long as it is slidably receivable on the spit. A thumbscrew 44 is screw-threadably mounted on the hub for releasably locking it in the desired position on the spit. Integral with the hub are a pair of outwardly extended axially spaced protuberances or bosses 46 and 48. The boss 46 is provided with a screw-threaded bore 50 and the boss 48 has a screw-threaded bore 52. Screw-threadably fitted in the bores are a pair of counterweights in the form of screw-threaded rods 54 and 56, respectively. If additional weight is needed the rods may be provided with enlarged head portions, not shown, as desired.

As best shown in FIG. 4, the bosses 46 and 48 are axially spaced along the hub 42 and are angularly related with the screw-threaded bores 50 and 52 having axes which are substantially mutually perpendicular or in a right angular relationship. The counterweight rods 54 and 56, which are shown in dashed lines in FIG. 4, have axes which are similarly related and can be axially adjusted therealong by turning each rod relative to its respective boss for precisely positioning the counterweights to overcome any imbalance in the cooking object 30.

OPERATION

The operation of the device of the present invention is believed to be clearly apparent and is briefly summarized at this point. The cooking object 30 and the counterbalancing device 40 are received on the spit 16 and locked thereto in the above described manner. The spit is then conveniently supported in the frame 10 of the rotisserie and the counterweights 54 and 56 are axially adjusted for approximately counterbalancing the imbalance of the cooking object. With the spit disposed over the bed of coals 14, the motor 22 rotates the spit at a slow speed. During the rotation of the spit any lugging or acceleration is noted and the counterweights are adjusted accordingly until the spit rotates in a continuously smooth manner for even cooking of the cooking object. Further adjustments to accommodate shrinking of the cooking object due to water or fat loss can also be accomplished during the cooking operation without interrupting the rotation of the spit.

There has been provided a counterbalancing device for precisely balancing a cooking object on a rotatable spit which is capable of fine adjustment during the cooking operation and is of simple economical construction for operating in a facile and reliable manner.

Although the invention has been herein shown and described in what is conceived to be the must practical and preferred embodiment, it is is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desired to secured by Letters Patent is:

1. A counterbalancing device for a cooking object eccentrically mounted on a rotatably driven barbeque spit comprising a support axially adjustably mounted on the spit and having angularly related bosses individually providing screw-threaded bores therethrough, means for releasably locking the support in desired position on the spit, and a plurality of weights providing elongated screw-threaded rods individually screw-threaded through said bores in the bosses for axial adjustment along angularly related axes in which each of said angularly related axes lies in a plane substantially normal to the axis of the spit and is substantially perpendicular to a radius extending from the axis of the spit in order precisely to adjust the center of gravity of the mass of the cooking object upon the spit.

* * * * *